United States Patent
Zhang et al.

(10) Patent No.: US 10,661,164 B2
(45) Date of Patent: May 26, 2020

(54) METHOD FOR CONTROLLING CHARACTER MOVEMENT IN GAME, SERVER, AND CLIENT

(71) Applicant: TENCENT TECHNOLOGY (SHENZHEN) COMPANY LIMITED, Shenzhen (CN)

(72) Inventors: Zhenxing Zhang, Shenzhen (CN); Bin Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 63 days.

(21) Appl. No.: 16/007,827

(22) Filed: Jun. 13, 2018

(65) Prior Publication Data

US 2018/0290058 A1    Oct. 11, 2018

Related U.S. Application Data

(63) Continuation of application No. PCT/CN2017/079734, filed on Apr. 7, 2017.

(30) Foreign Application Priority Data

Apr. 8, 2016    (CN) .......................... 2016 1 0219234

(51) Int. Cl.
*A63F 13/30* (2014.01)
*A63F 13/77* (2014.01)
(Continued)

(52) U.S. Cl.
CPC .............. *A63F 13/30* (2014.09); *A63F 13/35* (2014.09); *A63F 13/358* (2014.09); *A63F 13/42* (2014.09);
(Continued)

(58) Field of Classification Search
None
See application file for complete search history.

(56) References Cited

U.S. PATENT DOCUMENTS 6,208,358 B1 * 3/2001 Tsuzuki ................. A63F 13/10
345/473
2006/0026233 A1    2/2006 Tenembaum et al.
(Continued)

FOREIGN PATENT DOCUMENTS

| CN | 101335916 A | 12/2008 |
| CN | 102387132 A | 3/2012 |

(Continued)

OTHER PUBLICATIONS

The World Intellectual Property Organization (WIPO) International Search Report for PCT/CN2017/079734 dated Jul. 12, 2017 6 Pages (includimg translation).

(Continued)

*Primary Examiner* — Jason T Yen
(74) *Attorney, Agent, or Firm* — Anova Law Group, PLLC

(57) ABSTRACT

A method is provided for controlling game character movement for a server. The method includes receiving a movement-request data-packet sent by a first client, where the server is configured to manage a character movement on the first client and a character movement on a second client in a same game scene. The method also includes determining whether a target client is the first client or the second client according to the movement-request data-packet, where a character on the target client is a character whose movement needs to be controlled by the first client. Further, the method includes updating a movement identifier of the target client, and broadcasting the updated movement identifier of the target client to the first client and the second client.

12 Claims, 7 Drawing Sheets

(51) Int. Cl.
  *A63F 13/42* (2014.01)
  *A63F 13/822* (2014.01)
  *A63F 13/358* (2014.01)
  *A63F 13/56* (2014.01)
  *A63F 13/35* (2014.01)
(52) U.S. Cl.
  CPC .............. *A63F 13/56* (2014.09); *A63F 13/77* (2014.09); *A63F 13/822* (2014.09)

(56) References Cited

U.S. PATENT DOCUMENTS

| | | | |
|---|---|---|---|
| 2006/0056403 A1 | 3/2006 | Pleasant et al. | |
| 2006/0116186 A1* | 6/2006 | Sawada | A63F 13/10 463/4 |
| 2011/0118019 A1* | 5/2011 | Kondo | A63F 13/10 463/31 |
| 2012/0058829 A1* | 3/2012 | Yanagisawa | A63F 13/56 463/43 |
| 2015/0156278 A1 | 6/2015 | Perrin et al. | |
| 2017/0164136 A1* | 6/2017 | Saur | H04W 4/70 |

FOREIGN PATENT DOCUMENTS

| | | |
|---|---|---|
| CN | 102769616 A | 11/2012 |
| CN | 103701918 A | 4/2014 |
| CN | 105879391 A | 8/2016 |
| JP | 2006081193 A | 3/2006 |
| JP | 2015529875 A | 10/2015 |
| KR | 20100075695 A | 7/2010 |

OTHER PUBLICATIONS

The Japan Patent Office (JPO) Notification of Reasons for Refusal for Application No. 2018-533637 and Translation dated Jul. 16, 2019 6 Pages.
Lee Hongki, Lag in Network Game and Effort, Software Design, Japan, Gijutsu-Hyohron Co., Ltd., Apr. 18, 2011, vol. 312, pp. 50-59 13 Pages.
Korean Intellectual Property Office (KIPO) Office Action 1 for 20187018634 dated Oct. 18, 2019 12 Pages (including translation).

* cited by examiner

METHOD FOR CONTROLLING CHARACTER MOVEMENT IN GAME, SERVER, AND CLIENT

RELATED APPLICATIONS

This application is a continuation application of PCT Patent Application No. PCT/CN2017/079734, filed on Apr. 7, 2017, which claims priority to Chinese Patent Application No. 201610219234.4, entitled "METHOD FOR CONTROLLING CHARACTER MOVEMENT IN GAME, SERVER, AND CLIENT" filed with the Patent Office of China on Apr. 8, 2016, which is incorporated by reference in its entirety.

FIELD OF TECHNOLOGY

This application relates to the field of computer technologies and, in particular, to a method, server, and client for controlling movement of a game character.

BACKGROUND

When data packets are transmitted over a network, delay usually occurs. Thus, based on the server and client architecture, online games often have difficulty on synchronization. The character movement on a client is controlled by an operating user of the client and, when it is ensured that the client smoothly responds to local instructions from the user, timeliness of synchronization cannot be effectively ensured. Even for gaming devices in a same local area network, the transmission delay may cause some mistaken operations. To resolve this problem, in existing technologies, a dead reckoning algorithm for online games is designed.

In a multiplayer online battle arena (MOBA) game, most clients need to be provided with desirable solutions for movement control, so that players all have experience similar to experience of playing standalone games when there is a normal network delay. For example, in a 5v5 mode of a MOBA game, each client needs to interact with a server. Because of network delay, third-party data packets of the other nine clients that are obtained by one client are often delayed. The delay is specifically reflected in an uplink or downlink network transmission time. For example, an operation related to a movement such as direction changing, turning around, or stopping may cause a difference between a viewing angle of a player performing the operation and a viewing angle of another player.

By means of the dead reckoning algorithm provided in the existing technologies, movement paths can be synchronized. In a mobile network environment, for any tiny movement (for example, a movement compass is only touched on a client), a movement request is sent. When there is little interaction between clients, game experience is relatively desirable. However, when multiple inputs generate multiple outputs, and the outputs affect each other, the number of data packets is inevitably increased, and jitter on each client is also increased. Consequently, deformation or instant movement of game characters may occur on multiple game clients, lowering game experience.

The disclosed methods and systems are directed to solve one or more problems set forth above and other problems.

SUMMARY

Embodiments of the present disclosure provide a method for controlling a character movement in a game, a server, and a client, so as to reduce jitter caused by the character movement on the client, thereby improving game experience.

According to one aspect, an embodiment of this application provides a method for controlling a character movement in a game for a server. The method includes receiving a movement-request data-packet sent by a first client, where the server is configured to manage a character movement on the first client and a character movement on a second client in a same game scene. The method also includes determining whether a target client is the first client or the second client according to the movement-request data-packet, where a character on the target client is a character whose movement needs to be controlled by the first client. Further, the method includes updating a movement identifier of the target client, and broadcasting the updated movement identifier of the target client to the first client and the second client According to another aspect, an embodiment of this application further provides a server. The server includes a memory storing computer program instructions; and a processor coupled to the memory. When executing the computer program instructions, the processor is configured to perform: receiving a movement-request data-packet sent by a first client, where the server is configured to manage a character movement on the first client and a character movement on a second client in a same game scene; determining whether a target client is the first client or the second client according to the movement-request data-packet, where a character on the target client is a character whose movement needs to be controlled by the first client; and updating a movement identifier of the target client, and broadcasting the updated movement identifier of the target client to the first client and the second client.

According to another aspect, an embodiment of this application further provides a client. The client includes a memory storing computer program instructions; and a processor coupled to the memory. When executing the computer program instructions, the processor is configured to perform: sending a movement-request data-packet to a server, where the server determines, according to the movement-request data-packet, whether a target client is the client or a second client in a same game scene with the client, and a character on the target client being a character whose movement needs to be controlled by the client; receiving an updated movement identifier of the target client that is sent by the server; and displaying a character movement on the target client according to the received updated movement identifier of the target client.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings show only some embodiments of the present disclosure, and a person skilled in the technology may derive other drawings from these accompanying drawings without creative efforts.

DETAILED DESCRIPTION

Embodiments of the present disclosure provide a method for controlling game character movement, and a server and a client thereof, so as to reduce jitter caused by the character movement on the client, thereby improving game experience.

To make the objectives, features, and advantages of the present disclosure more comprehensible, the following describes the technical solutions in the embodiments of the present disclosure with reference to the accompanying drawings. Apparently, the described embodiments are only some of the embodiments of the present disclosure rather than all of the embodiments. All other embodiments obtained by a person skilled in the technology based on the disclosed embodiments of the present disclosure shall fall within the protection scope of the present disclosure.

The terms "include", "having", and any variants thereof in the specification and claims of the present disclosure and the foregoing accompanying drawings are intended to cover a non-exclusive inclusion, so that in the context of a process, method, system, product, or device that includes a series of units, the process, method, system, product, or device not only includes such units, but also includes units that are not specified expressly or that are inherent in the process, method, product, or device.

Figure 1:
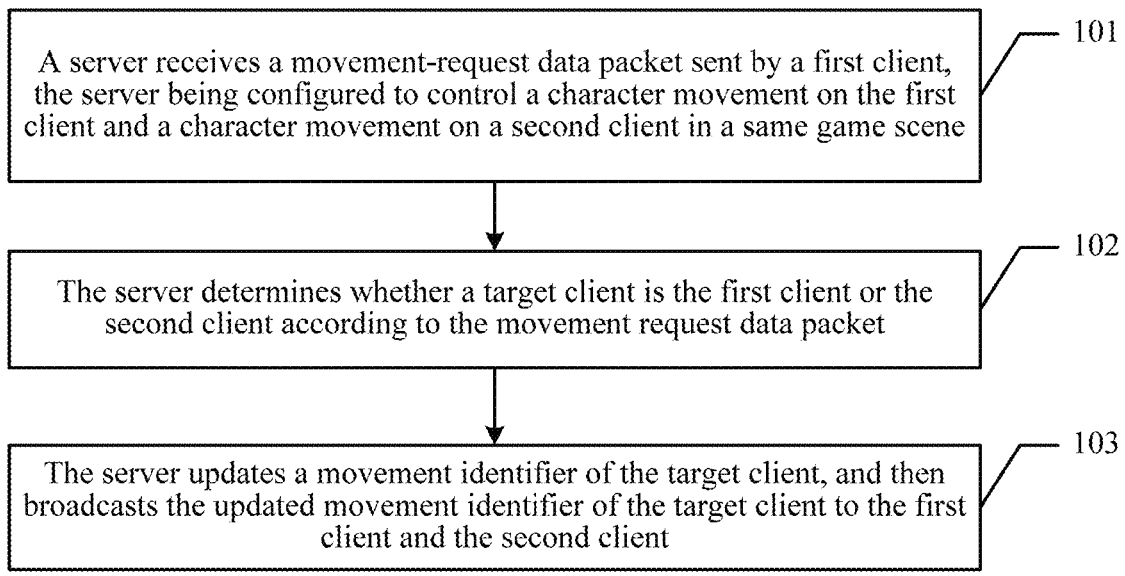
FIG. 1 is a schematic block flowchart of a method for controlling game character movement according to an embodiment of the present disclosure.

An embodiment of a method for controlling game character movement in the present disclosure may be specifically applied to a scenario in which a player controls a character movement on a client. A client may refer to a client-side application running on a user device, such as a game client application running on a gaming device of the user. FIG. 1 shows a method for controlling game character movement according to an embodiment of the present disclosure. Referring to FIG. 1, the method may include the followings.

101: A server receives a data packet of a movement request sent by a first client, the server being configured to manage movement of game characters on the first client and second client in a same game scene.

In one embodiment, communication connections are respectively established between the server and the first client and between the server and the second client. The server is configured to manage movement of one or more characters on each client. In one embodiment, for exemplary description, the server manages two clients (that is, the first client and the second client) in a same game scene, but this is not limiting. The server in one embodiment may alternatively manage more clients. For example, the server is in communication connection with a first client, a second client, and a third client that are in a same game scene. A manner in which the server controls character movements on the clients is similar to an interaction process between the two clients and the server in one embodiment, and reference may be made to descriptions of multiple application scenarios in subsequent embodiments of the present disclosure.

In one embodiment, without limitation, the first client is used as a sending end for sending a movement request. Certainly, the second client can also be used as a sending end for sending a movement request. Specifically, after determining a character whose movement needs to be controlled, the first client generates a movement-request data-packet, and sends the movement-request data-packet using a communication connection between the first client and the server. The server can receive the movement-request data-packet from the first client.

102: The server determines whether a target client is the first client or the second client according to the movement-request data-packet, a character on the target client being a character whose movement needs to be controlled by the first client.

In one embodiment, after receiving the movement-request data-packet, the server determines, according to the request content carried in the movement-request data-packet, which client has the character, whose movement needs to be controlled by the first client, in the same game scene. In the same game scene, the client on has the character whose movement needs to be controlled by the first client is referred to as the target client. If the server manages a character movement on the first client and a character movement on the second client, the target client may be the first client or the second client. The server may determine the target client among the clients it manages according to the received movement-request data-packet.

For example, in some embodiments of the present disclosure, in step 102, the process of determining whether a target client is the first client or the second client according to the movement-request data-packet may specifically include the following steps.

A1: The server determines that the target client is the first client if the movement-request data-packet carries a current movement identifier of the first client when the first client controls the current character movement of its own character.

A2: The server determines that the target client is the second client if the movement-request data-packet carries a request for the first client to control the character movement on the second client.

In step A1, if the first client needs to control the movement of its own character, for example, the first client controls the character on the first client to move forward using a movement compass, the first client may enable a current movement identifier of the first client to be carried in the movement-request data-packet. Therefore, the server may determine, according to the current movement identifier of the first client that is carried in the movement-request data-packet, that a target to be controlled by the first client this time is a character on the first client. That is, in this case, the server determines that the target client is the first client.

In the scenario shown in step A2, a difference between step A2 and step A1 is that, the first client can control the character movement on the first client, and can also control a character movement on another client in a same game scene. For example, the character on the first client needs to perform an attack, and the attacked object is the character on the second client. In this case, a current control behavior of the first client is controlling the second client. The movement-request data-packet sent by the first client may carry a request for controlling the second client. That is, in this case, the server can determine that a target to be controlled by the first client for this time is the second client according to the control request carried in the movement-request data-packet. According to the example described above, the first client may control the character movement on the first client, or may control a character movement on another client. In different implementation scenarios, the server may determine the target client by parsing the movement-request data-packet.

In some embodiments of the present disclosure, after the server determines whether a target client is the first client or the second client according to the movement-request data-packet in step 102, in the method for controlling game character movement according to one embodiment, step 103 may be subsequently performed, or the following steps may be performed:

B1: When the target client is the first client, the server determines, according to the current movement identifier of the first client, whether the current character movement on the first client meets a deviation tolerance condition configured in the server; and B2: If the current movement on the first client does not meet the deviation tolerance condition, the server updates the current movement identifier of the first client, and sends a movement refusal instruction to the first client, the movement refusal instruction carrying an updated movement identifier of the first client.

In step B1, the application scenario in which the target client is the first client is described. A deviation tolerance condition is configured in the server. The deviation tolerance condition is a condition under which the server can tolerate a deviation generated by a client. The deviation tolerance condition is set by the server according to a specific application scenario. Using the deviation tolerance condition, the server can determine whether a current movement behavior of the first client is beyond a tolerance limit of the server. For example, the current movement identifier of the first client that is carried the movement-request data-packet sent by the first client may be a current sequence number set by the first client for the character movement, and the deviation tolerance condition configured in the server may be a tolerance sequence number threshold preset in the server. It can be determined whether a current character movement on the first client meets the deviation tolerance condition by determining whether the current sequence number of the first client exceeds the tolerance sequence number threshold.

For another example, the current movement identifier of the first client may alternatively be a current movement token set by the first client for the character movement, and the deviation tolerance condition configured in the server may be a tolerance token number preset in the server. It can be determined whether a current movement on the first client meets the deviation tolerance condition by determining whether a current movement token of the first client is the same as the tolerance token number.

The server may update the current movement identifier of the first client, and send a movement refusal instruction to the first client if the current movement on the first client does not meet the deviation tolerance condition, the movement refusal instruction carrying the updated movement identifier of the first client. The server determines that the current character movement on the first client does not meet the deviation tolerance condition, that is, the current character movement on the first client is not accepted by the server, and the server may send a movement refusal instruction, so as to refuse the current character movement on the first client. Thus, the current character movement on the first client is not displayed on another client such as the second client, thereby avoiding a movement conflict with the second client that is caused by the current character movement on the first client.

103: The server updates the movement identifier of the target client, and then broadcasts the updated movement identifier of the target client to the first client and the second client.

In one embodiment, after determining the target client, the server updates a movement identifier of the target client. In one embodiment, the server sets a movement identifier for each character controlled by each client. The server may locally manage a local synchronization list, and manages a character movement on each client using the local synchronization list. The server controls a character movement on a client, and indicates that the character movement on the client is valid by updating the movement identifier of the client. In one embodiment, the server determines to update the movement identifier of the target client, so as to indicate that the server approves the character movement on the target client. Then the server updates the movement identifier of the target client, to obtain an updated movement identifier of the target client. Next, the server sends the updated movement identifier of the target client to multiple clients (the first client and the second client in this example) using a broadcast message. The clients receiving the broadcast message displays, by receiving the updated movement identifier of the target client, the character movement on the target client. In one embodiment, the right of controlling a character movement on a client is set in the server. The server can manage a character movement on each client, thereby changing a situation that the server functions only as a network forwarding device for data packets in the existing technologies. Therefore, a character movement on a client depends on whether the server updates a movement identifier, so that each client displays a character movement on a target client in order, thereby reducing jitter generated when multiple inputs of multiple clients generate multiple outputs and the outputs affect each other in the existing technologies, avoiding deformation or flash moving of a character on multiple game clients, effectively alleviating deformation or flash moving of a character displayed on a client, and improving game experience of a user.

In some embodiments of the present disclosure, in step 103, the process of updating a movement identifier of the target client may specifically include the following steps.

C1: The server obtains a current movement identifier of the first client from the movement-request data-packet.

C2: The server updates the current movement identifier of the first client, and saves the updated movement identifier of the first client.

When the target client is the first client, the server may obtain the current movement identifier of the first client from the movement-request data-packet, and may update the current movement identifier of the first client, to indicate that the server approves the character movement on the first client. The server saves the updated movement identifier of the first client in the local synchronization list. The updated movement identifier of the first client may be used as a basis for determining whether a next character movement on the first client is accepted by the server.

In some embodiments of the present disclosure, the following introduces a manner for updating a movement identifier when the target client is the second client. Specifically, in step 103, the updating, by the server, a movement identifier of the target client may specifically include the following steps.

D1: The server obtains a recorded movement identifier on the second client from a local synchronization list of the server when the target client is the second client.

D2: The server updates the recorded movement identifier of the second client according to the deviation tolerance condition configured in the server, and saves the updated movement identifier of the second client.

In step D1 of the foregoing embodiment of the present disclosure, an application scenario in which the target client is the second client is described. The server saves the local synchronization list. For different clients, a recorded movement identifier of each client is saved in the local synchronization list. In a scenario in which the first client controls the character movement on the second client, the server may first obtain a recorded movement identifier of the second client. The deviation tolerance condition is also set in the server. The deviation tolerance condition is a condition under which the server can tolerate a deviation generated by a client. The deviation tolerance condition is set by the server according to a specific application scenario. A movement behavior of the character on the second client when the character is controlled by the first client can be determined according to the deviation tolerance condition, so as to determine whether the current movement behavior of the character on the second client is beyond a tolerance limit of the server. Thus, the server can determine how to update the recorded movement identifier of the second client.

For example, the recorded movement identifier of the second client that is obtained by the server may be a current sequence number set by the second client for the character movement, and the deviation tolerance condition configured in the server may be a tolerance sequence number threshold preset in the server. It can be determined whether a current character movement on the second client meets the deviation tolerance condition by determining whether a current sequence number of the second client exceeds the tolerance sequence number threshold.

For another example, the recorded movement identifier of the second client may alternatively be a current movement token set by the second client for the character movement, and the deviation tolerance condition configured in the server may be a tolerance token number preset in the server. It can be determined whether a current character movement on the second client meets the deviation tolerance condition by determining whether a current movement token of the second client is the same as the tolerance token number.

Further, in another embodiment, when steps D1 and D2 are performed, in the method for controlling game character movement, the followings may further be performed.

E1: The server receives, after broadcasting the updated movement identifier of the target client to the first client and the second client, a movement-request data-packet sent by the second client, the movement-request data-packet sent by the second client carrying a current movement identifier of the second client when the second client controls the current character movement on the second client.

E2: The server determines, according to the current movement identifier of the second client, whether the current character movement on the second client meets the deviation tolerance condition configured in the server.

E3: The server filters out the movement-request data-packet sent by the second client, and sends a movement refusal instruction to the second client if the current character movement on the second client does not meet the deviation tolerance condition.

That is, the server broadcasts the updated movement identifier of the second client to the first client and the second client. If the second client also sends, before receiving the updated movement identifier of the second client, a movement-request data-packet to the server, the server may obtain the current movement identifier of the second client from the movement-request data-packet, and then determines whether the current character movement on the second client meets the deviation tolerance condition configured in the server. Reference may be made to the detailed descriptions in steps B1 and B2 for a specific determining manner. Further, when it is determined that the current character movement on the second client does not meet the deviation tolerance condition, it indicates that the server does not accept the character movement on the second client. The server filters out the movement-request data-packet sent by the second client, and sends a movement refusal instruction to the second client, so that the current movement on the second client is not displayed on a third-party client such as the first client, thereby avoiding a movement conflict with the first client that is caused by the current character movement on the second client.

According to the disclosed embodiments, the first client sends the movement-request data-packet to the server, the server determines whether the target client is the first client or the second client according to the movement-request data-packet, then the server updates the movement identifier of the target client, and the server broadcasts the updated movement identifier of the target client to the first client and the second client. After determining the target client, the server may update and broadcast the movement identifier of the target client, and both the first client and the second client can obtain the movement identifier of the target client using the broadcast of the server. Therefore, the first client needs to display the character movement on the target client according to the movement identifier updated by the server, so that the character movement on the target client is displayed according to updating performed by the server on the movement identifier of the target client. The first client displays the character movement on the target client only after the movement identifier updated by the server is obtained, so as to reduce jitter caused by the character movement on the client, thereby improving game experience.

Figure 2:
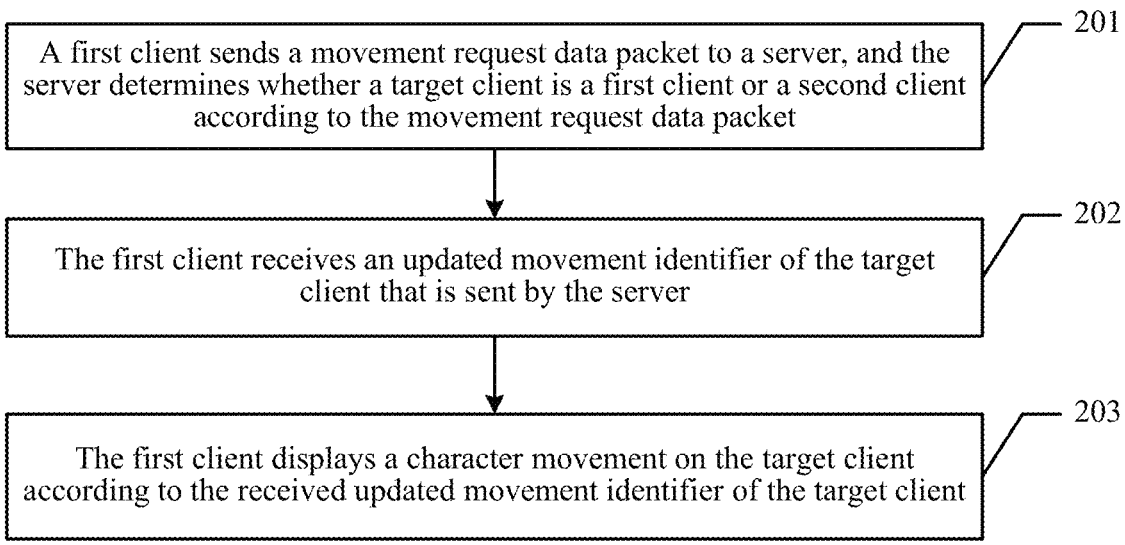
FIG. 2 is a schematic block flowchart of another method for controlling game character movement according to an embodiment of the present disclosure.

In the foregoing embodiments, detailed descriptions are made to the method for controlling game character movement provided in the present disclosure from an angle of the server. The following describes the method for controlling character movement in a game provided in the present disclosure from an angle of a client (for example, the first client). FIG. 2 shows a method for controlling game character movement according to an embodiment of the present disclosure. Referring to FIG. 2, the method may include the followings.

201: A first client sends a movement-request data-packet to a server, and the server determines whether a target client is the first client or a second client according to the movement-request data-packet, a character on the target client being a character whose movement needs to be controlled by the first client.

In the foregoing embodiment of the present disclosure, that the server manages two clients (that is, the first client and the second client) in a same game scene is used as an example for exemplary description. Without limitation, detailed descriptions are made below from an angle of the first client. In one embodiment, the server may alternatively manage more clients. For example, the server is in communication connection with a first client, a second client, and a third client that are in a same game scene. The manner in which the server controls character movements on the second client and the third client is similar to an interaction process between the first client and the server in one embodiment, and reference may be made to descriptions of multiple application scenarios in subsequent embodiments of the present disclosure.

First, after determining a character whose movement needs to be controlled, the first client generates a movement-request data-packet, and sends the movement-request data-packet using a communication connection between the first client and the server. Specifically, in step 201, the sending, by a first client, a movement-request data-packet to a server may include the following steps:

F1: The first client determines a character on the first client to control a current character movement, and sends the movement-request data-packet carrying a current movement identifier of the first client to the server.

F2: Alternatively or additionally, the first client determines a character on the second client in a same game scene for controlling the character movement, and sends the movement-request data-packet carrying a control request to the server.

In step F1 of the foregoing embodiment of the present disclosure, if the first client needs to control a movement behavior of a character on the first client, for example, the first client controls the character on the first client to move forward using a movement compass, the first client may include the current movement identifier of the first client in the movement-request data-packet. In the scenario shown in step F2, a difference between step F2 and step F1 is that, the first client can control the character movement on the first client, and can also control a character movement on another client in a same game scene. For example, the character on the first client needs to perform an attack, and an attacked object is the character on the second client. In this case, a current control behavior of the first client is controlling the second client. The movement-request data-packet sent by the first client may carry a request for controlling the second client.

In some embodiments of the present disclosure, in step F1, the process of sending the movement-request data-packet carrying a current movement identifier of the first client to the server specifically includes the followings.

F11: The first client sends, before receiving an updated movement identifier of the target client that is sent by the server, the movement-request data-packet carrying the current movement identifier of the first client to the server, and the first client may repeat sending the movement-request data-packet for multiple times.

The server may respond to the movement-request data-packet sent by the first client, and may broadcast the updated movement identifier of the target client to the first client. Considering a network delay, the first client may send the movement-request data-packet carrying the current movement identifier of the first client repeatedly for multiple times, and the movement-request data-packet sent for each time carries the same current movement identifier of the first client. For the movement-request data-packet sent by the first client repeatedly for multiple times, the server may respond to the request each time, and a movement notification data packet as a reply to the first client for each time carries the movement identifier of the first client that is updated by the server, so that the second client in the same game scene as the first client can obtain the latest movement identifier of the first client in time, and the second client displays the character movement on the first client according to the latest movement identifier of the first client that is sent by the server.

202: The first client receives an updated movement identifier of the target client sent by the server.

In one embodiment, after the server generates an updated movement identifier of the target client, the server starts to broadcast the updated movement identifier of the target client. The first client receives the updated movement identifier of the target client using a communication connection with the server.

203: The first client displays a character movement on the target client according to the received updated movement identifier of the target client.

In one embodiment, for different implementations of the target client, the first client may display the character movement on the target client according to a status of updating performed by the server on the movement identifier of the target client. If the first client does not receive the updated movement identifier of the target client that is broadcasted by the server, the first client does not respond to the character movement on the target client. Therefore, a character movement on a client depends on whether or not the server updates the movement identifier, so that each client displays the character movement on the target client in order, thereby reducing jitter generated when multiple inputs of multiple clients generate multiple outputs and the outputs affect each other in the existing technologies, avoiding that deformation or instant movement of a character occurs on multiple game clients, effectively alleviating deformation or instant movement of a character displayed on a client, and improving game experience of a user.

That is, the first client sends the movement-request data-packet to the server, the server determines whether the target client is the first client or the second client according to the movement-request data-packet, then the server updates the movement identifier of the target client, and the server broadcasts the updated movement identifier of the target client to the first client and the second client. After determining the target client, the server may update and broadcast the movement identifier of the target client, and both the first client and the second client can obtain the movement identifier of the target client using the broadcast of the server. Therefore, the first client needs to display the character movement on the target client according to the movement identifier updated by the server, so that the character movement on the target client is displayed according to updating performed by the server on the movement identifier of the target client. The first client displays the character movement on the target client only after the movement identifier updated by the server is obtained, so as to reduce jitter caused by the character movement on the client, thereby improving game experience.

Figure 3A:
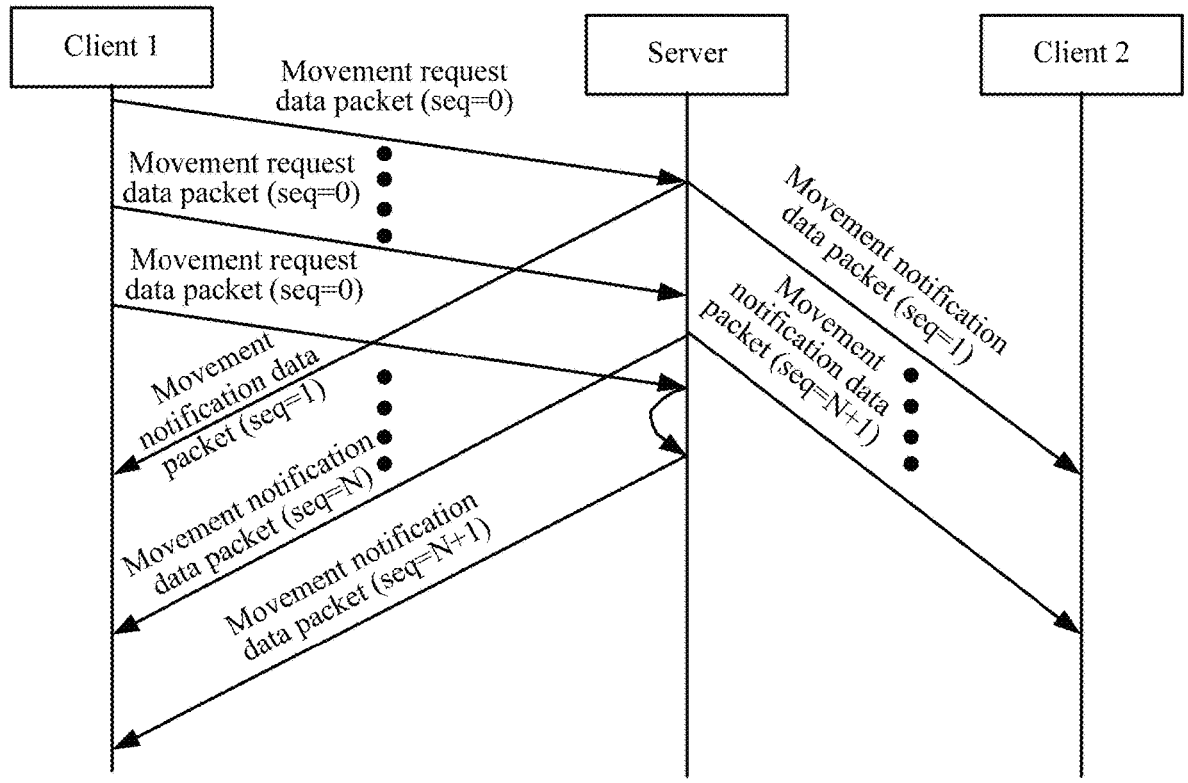
FIG. 3A is a schematic diagram of an application scenario of synchronization between sequence numbers of clients according to an embodiment of the present disclosure.

For better understanding and implementation of the foregoing solutions of one embodiment, specific descriptions are made below by using corresponding application scenarios. One embodiment is intended to, by updating the movement identifier, reduce movement conflicts caused by a third-party control in a current multiplayer online mobile games, to ensure better game experience. For mobile MOBA games, movement display is desirably optimized. Exemplary descriptions are made below by using that a movement identifier is updated specifically using sequence number synchronization as an example. That is, the character movement is controlled using a sequence number sliding window. FIG. 3A is a schematic diagram of an application scenario of synchronization between sequence numbers of clients according to an embodiment of the present disclosure. Descriptions are made by using synchronization of movement sequence numbers as an example. Herein, only an anomaly in sequence numbers is described, and situations such as a network delay are ignored. Referring to FIG. 3A, the method is based on synchronization of sequence numbers, and mainly includes the followings.

The server and each client save sequence number synchronization information, and it is assumed that a tolerance sequence number threshold configured in the server is N−1. If a sequence number difference between a client and the server is less than N, a movement-request data-packet is accepted, and the server responds to the movement-request data-packet.

If a character on a client 1 needs movement, a movement-request data-packet is sent to the server. A movement sequence number is initialized as 0. A current sequence number seq carried in the movement-request data-packet is 0. Each movement operation on the client corresponds to a sequence number. After receiving the movement-request data-packet, the server determines that a character to be moved is a character on the client 1. The server compares the sequence number carried in the received movement-request data-packet with a local sequence number, and it is found that a sequence number difference between the server and the client is within a tolerance sequence number threshold. The server updates the current sequence number seq of the client 1 as 1, and then broadcasts the movement notification data packet to the clients. Using a 5v5 game as an example, the server needs to broadcast a movement notification data packet to 10 clients. A sequence number seq carried in the movement notification data packet is 1. The server broadcasts the movement notification data packet to the client 1. The client 1 learns that the server approves this request according to the received movement notification data packet.

Before receiving a movement notification data packet sent by the server, the client 1 sends a movement-request data-packet for multiple times. The current sequence number seq carried in the movement-request data-packet is 0. The server returns a movement notification data packet corresponding to each request of the client 1. A sequence number carried in the movement notification data packet gradually increases. After N cycles, it is assumed that the client 1 does not receive the corresponding movement notification data packet sent by the server yet, and does not update a local sequence number, the client keeps a local sequence number, and the sequence number is updated each time the server makes a correct reply. When the client 1 sends the $N^{th}$ data packet, a sequence number uploaded is still 0. At this time, the server finds that a sequence number difference between the server and the client is N, which is greater than a tolerable sequence number deviation. Therefore, the server notifies the client 1 of the new sequence number (seq=N+1), and the server sends the sequence number to the client 1 independently. After the client 1 sends a movement-request data-packet according to the new sequence number, the server broadcasts a movement notification data packet again.

Figure 3B:
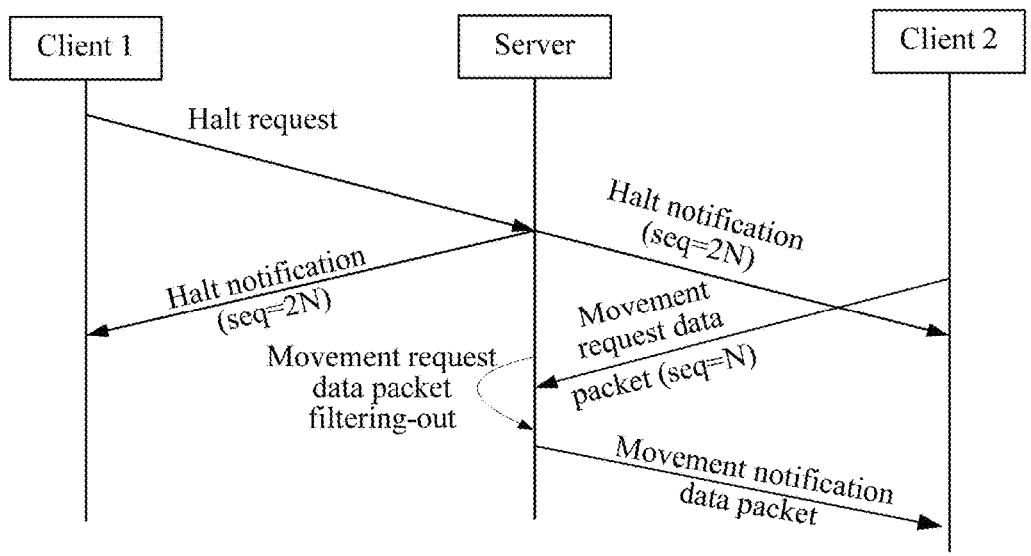
FIG. 3B is a schematic diagram of another application scenario of synchronization between sequence numbers of clients according to an embodiment of the present disclosure.

FIG. 3B is a schematic diagram of another application scenario of synchronization of sequence numbers of clients according to an embodiment of the present disclosure. Descriptions are made by using synchronization of movement sequence numbers as an example. Referring to FIG. 3B, using an application scenario in which a client 1 controls a character on a client 2 to halt as an example, the method mainly includes the followings.

In FIG. 3B, it is assumed that a character movement on the client 2 is not affected by another effect other than a sequence number and a halt effect. The halt means that, in a game, one player halts a movement of another player. First, the client 1 needs to halt the character on the client 2 because of an operation. In this case, the client 1 sends a halt request to the server. After receiving the halt request sent by the client 1, the server locally check a context environment. After the client 1 passes identity authentication, the server obtains a recorded sequence number N of the client 2 from a local synchronization list. After increasing the recorded sequence number N of the client to 2N, the server broadcasts a halt notification to the client 1 and the client 2. The updated sequence number seq carried in the halt notification is 2N. The new sequence number is synchronized on the client 1 and on the client 2. Before receiving the new sequence number, the client 2 continues to send the old sequence number to the server. At this time, the server finds that the sequence number deviation already exceeds the sequence number tolerance threshold, and directly filters out the movement-request data-packet of the client 2, so as to ensure that the character movement on the client 2 is not valid on another client, that is, the character on the client 2 displayed on the client 1 does not move. For example, if the character on the client 1 uses a skill to control the character on the client 2 to halt, the server filters out the movement request of the client 2, so as to ensure that the character on the client 2 cannot move because the server does not respond to the movement request of the client 2.

Figure 4:
FIG. 4 is a schematic diagram of a game scene when sequence numbers are not synchronized according to an embodiment of the present disclosure.
Figure 5:
FIG. 5 is a schematic diagram of a game scene after sequence numbers are synchronized according to an embodiment of the present disclosure.

Referring to FIG. 4 and FIG. 5, FIG. 4 is a schematic diagram of a game scene when sequence numbers are not synchronized according to an embodiment of the present disclosure, and FIG. 5 is a schematic diagram of a game scene after sequence numbers are synchronized according to an embodiment of the present disclosure. As shown in FIG. 4, the sequence number synchronization is not performed and, when a character Crystal Maiden uses a skill to halt another character, because sequence number synchronization is not performed, the another character continues to move forward by a distance. That is, the skill on a client on which a player controls Crystal Maiden is not expressive enough. As shown FIG. 5, after sequence number synchronization provided in one embodiment is performed, movements and skill presentation of the characters are relatively desirable. After being halted by Crystal Maiden, the halt of the other character is more expressive. Because a movement-request data-packet for the other character is not broadcast by the server, the client on which the player controls Crystal Maiden shows that the another character is halted. Using the foregoing solution provided in the present disclosure, network stalling, a movement delay on a third-party client, and deformation or instant movement of a character on the third-party client are desirably resolved, thereby ensuring that when there is a normal network delay, desirable game experience of a player on each client is ensured.

It should be noted that, for ease of description, the foregoing method embodiments are described as a series of action combinations. However, a person skilled in the technology should understand that the present disclosure is not limited to the described sequence of the actions, because some steps may be performed in another sequence or performed at the same time according to the present disclosure. In addition, a person skilled in the technology should also know that all the embodiments described in this specification are examples, and the related actions and modules are not necessarily required in the present disclosure.

To better implement the foregoing solutions in the embodiments of the present disclosure, the following further provides related apparatuses configured to implement the foregoing solutions.

Figure 6A:
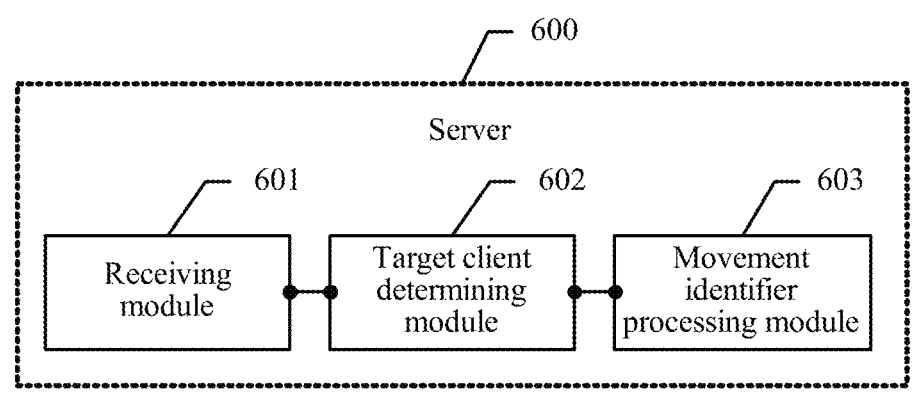
FIG. 6A is a schematic structural composition diagram of a server according to an embodiment of the present disclosure.

Referring to FIG. 6A, a server 600 provided in an embodiment of the present disclosure may include: a receiving module 601, a target client determining module 602, and movement identifier processing module 603.

The receiving module 601 is configured to receive a movement-request data-packet sent by a first client, the server being configured to manage a character movement on the first client and a character movement on a second client in a same game scene.

The target client determining module 602 is configured to determine whether a target client is the first client or the second client according to the movement-request data-packet. The character on the target client is a character whose movement needs to be controlled by the first client, i.e., sender of the movement-request data-packet.

The movement identifier processing module 603 is configured to update a movement identifier of the target client, then the server broadcasts the updated movement identifier of the target client to the first client and the second client.

In some embodiments of the present disclosure, the target client determining module 602 is specifically configured to: determine that the target client is the first client if the movement-request data-packet carries a current movement identifier of the first client when the first client controls a current character movement on the first client; or determine that the target client is the second client if the movement-request data-packet carries a request for controlling the character movement on the second client by the first client.

Figure 6B:
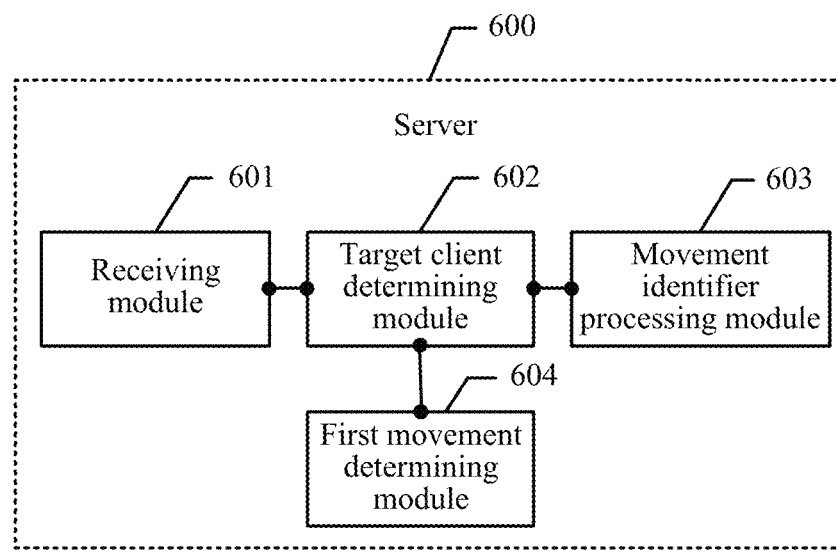
FIG. 6B is a schematic structural composition diagram of another server according to an embodiment of the present disclosure.

In some embodiments of the present disclosure, referring to FIG. 6B, the server 600 further includes: a first movement determining module 604.

The first movement determining module 604 is configured to: after the target client determining module 602 determines whether the target client is the first client or the second client according to the movement-request data-packet, when the target client is the first client, determine, according to the current movement identifier of the first client, whether the current character movement on the first client meets a deviation tolerance condition configured in the server.

The movement identifier processing module 603 is further configured to: update the current movement identifier of the first client, and send a movement refusal instruction to the first client if the current character movement on the first client does not meet the deviation tolerance condition, the movement refusal instruction carrying the updated movement identifier of the first client.

Figure 6C:
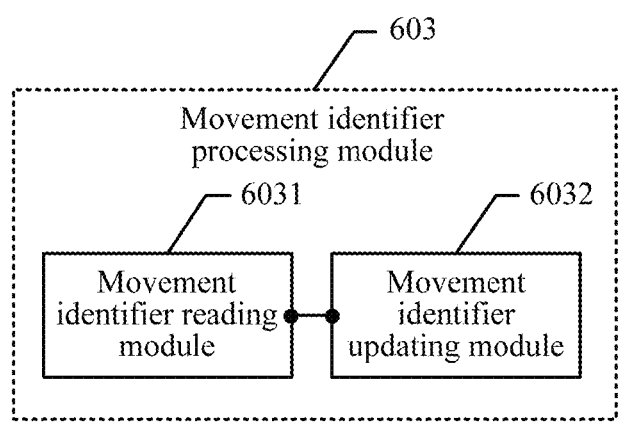
FIG. 6C is a schematic structural composition diagram of a movement identifier processing module according to an embodiment of the present disclosure.

In some embodiments of the present disclosure, referring to FIG. 6C, the movement identifier processing module 603 includes a movement identifier reading module 6031 and a movement identifier updating module 6032.

The movement identifier reading module 6031 is configured to obtain a recorded movement identifier of the second client from a local synchronization list of the server when the target client is the second client. The movement identifier updating module 6032 is configured to: update the recorded movement identifier of the second client according to the deviation tolerance condition configured in the server, and save the updated movement identifier of the second client.

Figure 6D:
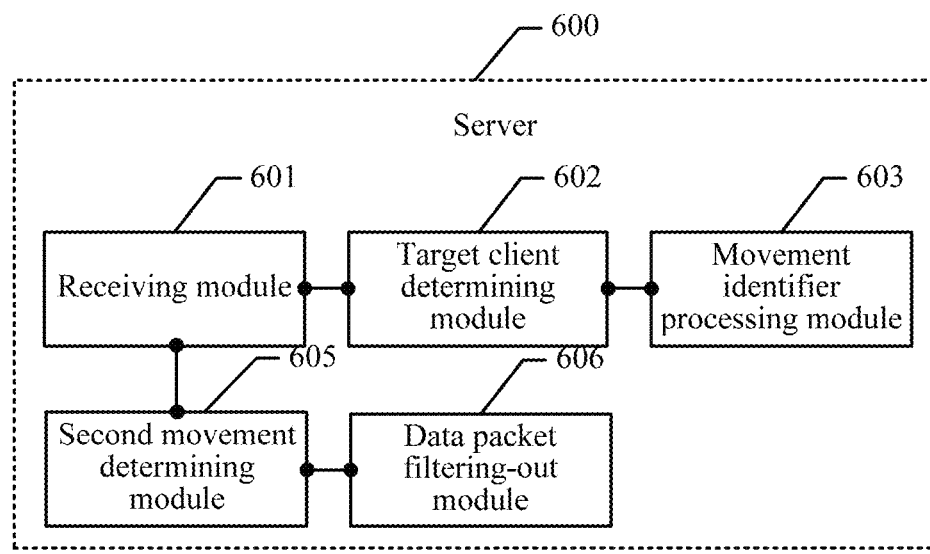
FIG. 6D is a schematic structural composition diagram of another server according to an embodiment of the present disclosure.

In some embodiments of the present disclosure, referring to FIG. 6D, compared with FIG. 6A, the server 600 further includes: a second movement determining module 605 and a data packet filtering-out module 606.

The receiving module 601 is further configured to: receive, after the movement identifier processing module 603 broadcasts the updated movement identifier of the target client to the first client and the second client, a movement-request data-packet sent by the second client, the movement-request data-packet sent by the second client carrying a current movement identifier of the second client when the second client controls a current character movement on the second client.

The second movement determining module 605 is configured to determine, according to the current movement identifier of the second client, whether the current character movement on the second client meets the deviation tolerance condition configured in the server.

The data packet filtering-out module 606 is configured to: filter out the movement-request data-packet sent by the second client, and send a movement refusal instruction to the second client if the current character movement on the second client does not meet the deviation tolerance condition.

Accordingly, the first client sends the movement-request data-packet to the server, the server determines whether the target client on which a character movement needs to be controlled by the first client is the first client or the second client according to the movement-request data-packet, then the server updates the movement identifier of the target client, and the server broadcasts the updated movement identifier of the target client to the first client and the second client. After determining the target client, the server may update and broadcast the movement identifier of the target client, and both the first client and the second client can obtain the movement identifier of the target client using the broadcast of the server. Therefore, the first client needs to display the character movement on the target client according to the movement identifier updated by the server, so that the character movement on the target client is displayed according to updating performed by the server on the movement identifier of the target client. The first client displays the character movement on the target client only after the movement identifier updated by the server is obtained, so as to reduce jitter caused by the character movement on the client, thereby improving game experience.

Figure 7:
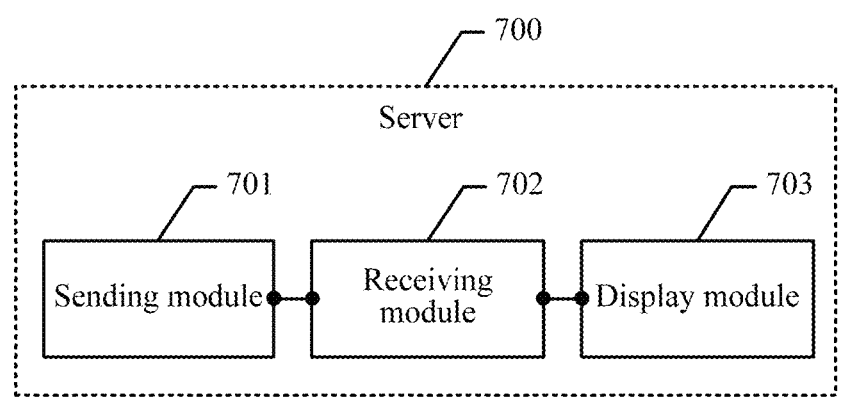
FIG. 7 is a schematic structural composition diagram of a client according to an embodiment of the present disclosure.

Referring to FIG. 7, an embodiment of the present disclosure provides a client 700. The client 700 is specifically a first client. The first client and a second client are in a same game scene. The first client includes: a sending module 701, a receiving module 702, and a display module 703.

The sending module 701 is configured to send a movement-request data-packet to a server, the server determining whether a target client is the first client or the second client according to the movement-request data-packet, and a character on the target client being a character whose movement needs to be controlled by the first client.

The receiving module 702 is configured to receive an updated movement identifier of the target client that is sent by the server.

The display module 703 is configured to display a character movement on the target client according to the received updated movement identifier of the target client.

In some embodiments of the present disclosure, the sending module 701 is specifically configured to: send the movement-request data-packet carrying a current movement identifier of the first client to the server when the first client determines control on a current character movement on the first client; or send the movement-request data-packet carrying a control request to the server when the first client determines control on a character movement on the second client in a same game scene.

In some embodiments of the present disclosure, the sending module 701 is specifically configured to send, before receiving the updated movement identifier of the target client that is sent by the server, the movement-request data-packet carrying the current movement identifier of the first client repeatedly for multiple times.

That is, the first client sends the movement-request data-packet to the server, the server determines whether the target client is the first client or the second client according to the movement-request data-packet, then the server updates the movement identifier of the target client, and the server broadcasts the updated movement identifier of the target client to the first client and the second client. After determining the target client, the server may update and broadcast the movement identifier of the target client, and both the first client and the second client can obtain the movement identifier of the target client using the broadcast of the server. Therefore, the first client needs to display the character movement on the target client according to the movement identifier updated by the server, so that the character movement on the target client is displayed according to updating performed by the server on the movement identifier of the target client. The first client displays the character movement on the target client only after the movement identifier updated by the server is obtained, so as to reduce jitter caused by the character movement on the client, thereby improving game experience.

Figure 8:
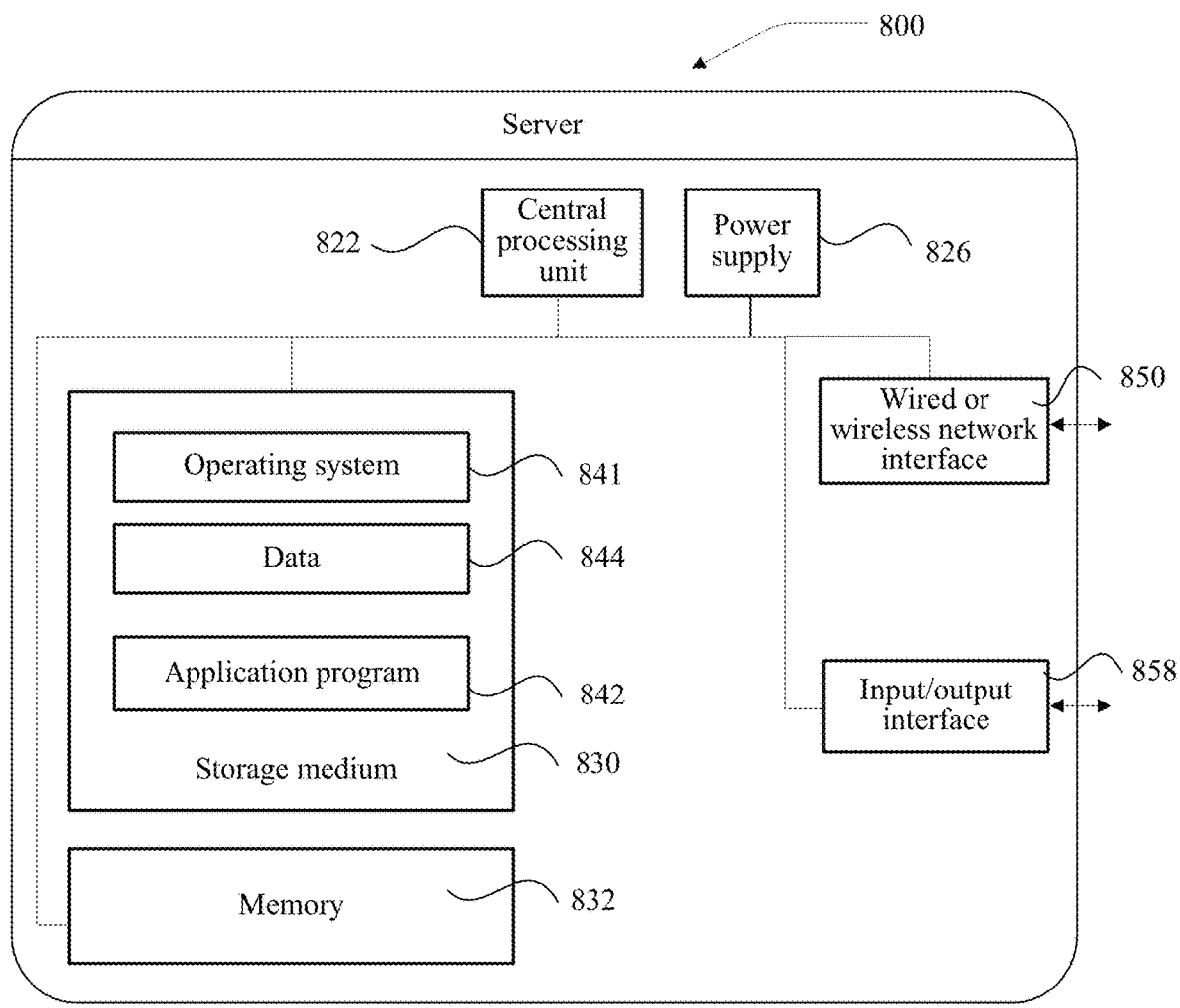
FIG. 8 is a schematic structural composition diagram of applying a method for controlling game character movement to a server according to an embodiment of the present disclosure.

FIG. 8 is a schematic structural diagram of a server according to an embodiment of the present disclosure. The server 800 may vary greatly due to different configurations or performance, and may include one or more central processing units (CPU) 822 (for example, one or more processors) and a memory 832, and one or more storage media 830 (for example, one or more mass storage devices) that store application programs 842 or data 844. The memory 832 and the storage medium 830 may be transient or persistent storages. The program stored in the storage medium 830 may include one or more modules (not shown), and each module may include a series of instructions and operations for the server. Still further, the CPU 822 may be configured to: communicate with the storage medium 830, and perform, on the server 800, a series of instructions and operations in the storage medium 830.

The server 800 may further include one or more power supplies 826, one or more wired or wireless network interfaces 850, one or more input/output interfaces 858, and/or one or more operating systems 841, for example, Windows Server™, Mac OS X™, Unix™, Linux™, or FreeBSD™.

The disclosed methods for controlling game character movement that are performed by the server may be based on the server structure shown in FIG. 8.

Figure 9:
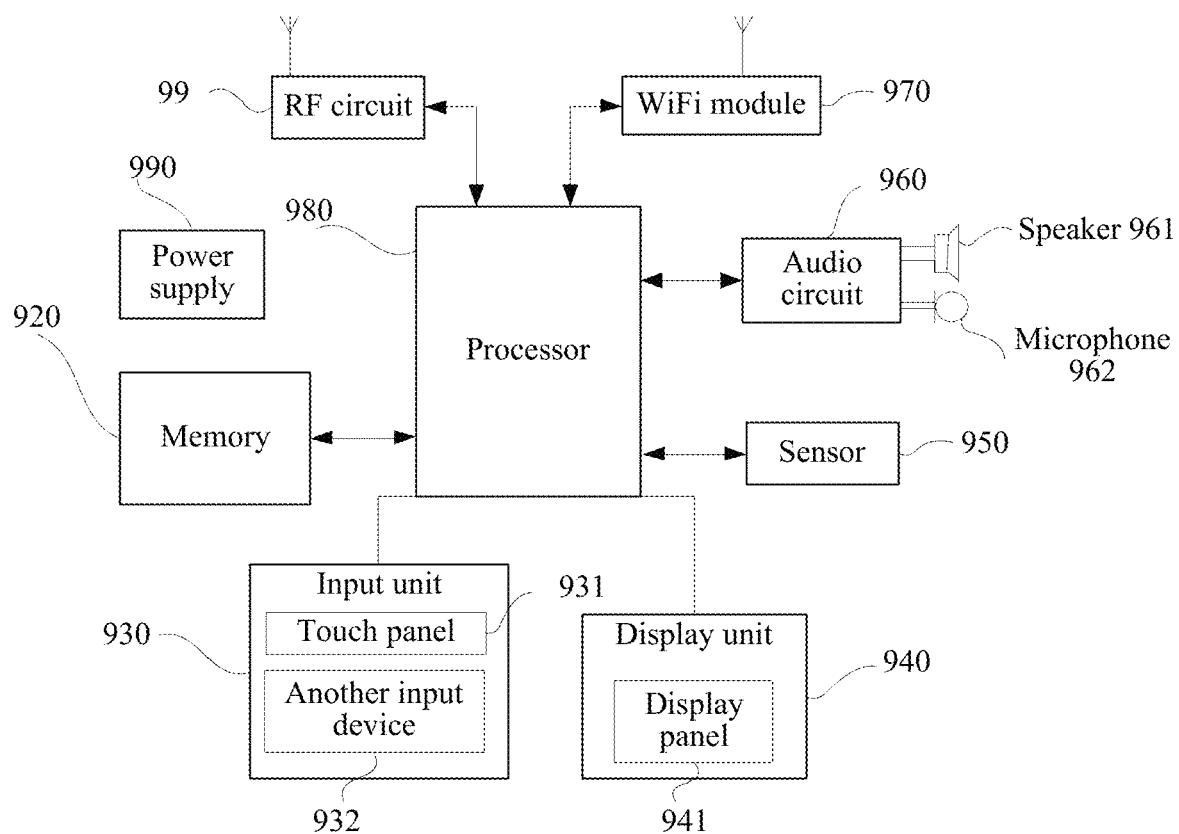
FIG. 9 is a schematic structural composition diagram of applying a method for controlling game character movement to a terminal according to an embodiment of the present disclosure.

An embodiment of the present disclosure further provides a terminal, as shown in FIG. 9, and for convenience of description, only related parts are shown. For specific technical details that are not disclosed, refer to the method part of the embodiments of the present disclosure. The terminal may be any terminal device such as a mobile phone, a tablet computer, a personal digital assistant (PDA), a point of sales (POS), and an in-vehicle computer. That the terminal is a mobile phone is used as an example.

FIG. 9 is a block diagram of a structure of a part of a mobile phone related to a terminal according to an embodiment of the present disclosure. Referring to FIG. 9, the mobile phone includes components such as a radio frequency (RF) circuit 99, a memory 920, an input unit 930, a display unit 940, a sensor 950, an audio circuit 960, a wireless fidelity (WiFi) module 970, a processor 980, and a power supply 990. A person skilled in the technology may understand that the structure of the mobile phone shown in FIG. 9 does not constitute a limitation to the mobile phone, and the mobile phone may include more components or fewer components than those shown in the figure, or some components may be combined, or a different component deployment may be used.

The RF circuit 99 may be configured to receive and send a signal during an information receiving and sending process or a call process. Specifically, the RF circuit receives downlink information from a base station, then delivers the downlink information to the processor 980 for processing, and sends related uplink data to the base station. Generally, the RF circuit 99 includes, but is not limited to, an antenna, at least one amplifier, a transceiver, a coupler, a low noise amplifier (LNA), and a duplexer. In addition, the RF circuit 99 may also communicate with a network and another device using wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be configured to store a software program and module. The processor 980 runs the software program and module stored in the memory 920, to implement various functional applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 920 may include a high speed random access memory, and may also include a non-volatile memory such as at least one magnetic disk storage device, a flash memory, or another volatile solid-state storage component.

The input unit 930 may be configured to receive input digit or character information, and generate a keyboard signal input related to the user setting and function control of the mobile phone. Specifically, the input unit 930 may include a touch panel 931 and another input device 932. The touch panel 931 may also be referred to as a touchscreen, and may collect a touch operation of a user on or near the touch panel (such as an operation of a user on or near the touch panel 931 by using any suitable object or attachment, such as a finger or a touch pen), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinate to the processor 980. Moreover, the touch controller can receive and execute a command sent from the processor 980. In addition, the touch panel 931 may be a resistive, capacitive, infrared, or surface sound wave type touch panel. In addition to the touch panel 931, the input unit 930 may further include another input device 932. Specifically, another input device 932 may include, but is not limited to: one or more of a physical keyboard, a functional key (such as a volume control key or a switch key), a track ball, a mouse, and a joystick.

The display unit 940 may be configured to display information input by the user or information provided for the user, and various menus of the mobile phone. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel 931, the touch panel 931 transfers the touch operation to the processor 980, so as to determine a type of a touch event. Then, the processor 980 provides corresponding visual output on the display panel 941 according to the type of the touch event. Although, in FIG. 9, the touch panel 931 and the display panel 941 are used as two separate parts to implement input and output functions of the mobile phone, in some embodiments, the touch panel 931 and the display panel 941 may be integrated to implement the input and output functions of the mobile phone.

The mobile phone may further include at least one sensor 950 such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 960, a speaker 961, and a microphone 962 may provide audio interfaces between the user and the mobile phone. The audio circuit 960 may convert received audio data into an electric signal and transmit the electric signal to the speaker 961. The speaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another mobile phone by using the RF circuit 99, or outputs the audio data to the memory 920 for further processing.

WiFi is a short distance wireless transmission technology. The mobile phone may help, by using the WiFi module 970, the user to receive and send e-mails, browse a web page, access streaming media, and so on, which provides wireless broadband Internet access for the user. Although FIG. 9 shows the WiFi module 970, it may be understood that the WiFi module 970 is not a necessary component of the mobile phone, and when required, the WiFi module 970 may be omitted as long as the scope of the essence of the present disclosure is not changed.

The processor 980 is the control center of the mobile phone, and is connected to various parts of the mobile phone by using various interfaces and lines. By running or executing the software program and/or module stored in the memory 920, and invoking data stored in the memory 920, the processor 980 performs various functions and data processing of the mobile phone, thereby performing overall monitoring on the mobile phone. Optionally, the processor 980 may include one or more processing units. Preferably, the processor 980 may integrate an application processor and a modem processor. The application processor mainly processes an operating system, a user interface, an application program, and the like. The modem processor mainly processes wireless communication. It may be understood that the foregoing modem processor may be not integrated into the processor 980.

The mobile phone further includes the power supply 990 (such as a battery) for supplying power to the components. Preferably, the power supply may be logically connected to the processor 980 by using a power management system, thereby implementing functions such as charging, discharging and power consumption management by using the power management system.

Although not shown in the figure, the mobile phone may further include a camera, a Bluetooth module, and the like, which are not further described herein.

In one embodiment, the processor 980 included in the terminal is capable of performing the foregoing procedures of the method for controlling character movement in a game.

It should be further noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be specifically implemented as one or more communications buses or signal cables. A person of ordinary skill in the technology may understand and implement the embodiments of the present disclosure without creative efforts.

Based on the foregoing descriptions of the embodiments, a person skilled in the technology may clearly understand that the present disclosure may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on this, the technical solutions of the present disclosure or the part that makes contributions to the existing technology can be substantially embodied in the form of a software product. The computer software product is stored in a readable storage medium, for example, a floppy disk, a USB flash drive, a removable hard disk, a read-only memory (ROM), a random access memory (RAM), a magnetic disk, or an optical disc of the computer, and includes several instructions used to instruct a computer device (for example, a personal computer, a server, or a network device) to perform the methods according to the embodiments of the present disclosure.

In conclusion, the foregoing embodiments are merely intended for describing the technical solutions of the present disclosure but not for limiting the present invention. Although the present disclosure is described in detail with reference to the foregoing embodiments, a person of ordinary skill in the technology should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for controlling game character movement, comprising:
    receiving, by a server, a movement-request data-packet sent by a first client, the server being configured to manage a character movement on the first client and a character movement on a second client in a same game scene;
    determining, by the server, a target client according to the movement-request data-packet, a character on the target client being a character whose movement needs to be controlled by the first client, comprising:
        when the movement-request data-packet of the first client carries a current movement identifier of the first client indicating that the first client controls a first character movement on the first client, determining, by the server, that the target client is the first client; and
        when the movement-request data-packet of the first client carries a request for controlling a second character movement on the second client by the first client, determining, by the server, that the target client is the second client; and
    updating, by the server, a movement identifier of the target client, and broadcasting the updated movement identifier of the target client to the first client and the second client, comprising:
        determining, by the server according to the current movement identifier of the first client, whether the first character movement on the first client meets a deviation tolerance condition configured in the server; and
        when the first character movement on the first client does not meet the deviation tolerance condition, updating, by the server, the current movement identifier of the first client, and sending a movement refusal instruction to the first client, the movement refusal instruction carrying the updated movement identifier of the first client.

2. The method according to claim 1, wherein the updating, by the server, a movement identifier of the target client comprises:
    obtaining, by the server, a recorded movement identifier of the second client from a local synchronization list of the server when the target client is the second client; and
    updating, by the server, the recorded movement identifier of the second client according to the deviation tolerance condition configured in the server, and saving the updated movement identifier of the second client.

3. The method according to claim 2, further comprising:
    receiving, by the server and after broadcasting the updated movement identifier of the target client to the first client and the second client, a movement-request data-packet sent by the second client, the movement-request data-packet sent by the second client carrying a current movement identifier of the second client indicating that the second client controls a third character movement on the second client;
    determining, by the server according to the current movement identifier of the second client, whether the third character movement on the second client meets the deviation tolerance condition configured in the server; and
    filtering out, by the server, the movement-request data-packet sent by the second client, and sending a movement refusal instruction to the second client if the third character movement on the second client does not meet the deviation tolerance condition.

4. The method according to claim 1, further comprising:
    sending, by the first client, the movement-request data-packet to the server;
    receiving, by the first client, an updated movement identifier of the target client that is sent by the server; and
    displaying, by the first client, a character movement on the target client according to the received updated movement identifier of the target client.

5. The method according to claim 4, wherein the sending, by the first client, the movement-request data-packet to the server comprises:
    determining, by the first client, control of the first character movement on the first client, and sending the movement-request data-packet carrying the current movement identifier of the first client to the server; or
    determining, by the first client, control of the second character movement on the second client in a same game scene, and sending, by the first client, the movement-request data-packet carrying the control request to the server.

6. The method according to claim 5, wherein the sending, by the first client, the movement-request data-packet carrying the current movement identifier of the first client to the server comprises:

sending, by the first client and before receiving the updated movement identifier of the target client that is sent by the server, the movement-request data-packet carrying the current movement identifier of the first client repeatedly for multiple times.

7. A server, comprising:

a memory storing computer program instructions; and a processor coupled to the memory and, when executing the computer program instructions, configured to perform:

receiving a movement-request data-packet sent by a first client, the server being configured to manage a character movement on the first client and a character movement on a second client in a same game scene;

determining a target client according to the movement-request data-packet, a character on the target client being a character whose movement needs to be controlled by the first client, comprising:

when the movement-request data-packet of the first client carries a current movement identifier of the first client indicating that the first client controls a first character movement on the first client, determining, by the server, that the target client is the first client; and when the movement-request data-packet of the first client carries a request for controlling a second character movement on the second client by the first client, determining, by the server, that the target client is the second client; and updating a movement identifier of the target client, and broadcasting the updated movement identifier of the target client to the first client and the second client, comprising:

determining, by the server according to the current movement identifier of the first client, whether the first character movement on the first client meets a deviation tolerance condition configured in the server; and when the first character movement on the first client does not meet the deviation tolerance condition, updating, by the server, the current movement identifier of the first client, and sending a movement refusal instruction to the first client, the movement refusal instruction carrying the updated movement identifier of the first client.

8. The server according to claim 7, wherein the updating a movement identifier of the target client comprises:

obtaining a recorded movement identifier of the second client from a local synchronization list of the server when the target client is the second client; and updating the recorded movement identifier of the second client according to the deviation tolerance condition configured in the server, and saving the updated movement identifier of the second client.

9. The storage medium according to claim 8, wherein the processor is further configured to perform:

receiving, after broadcasting the updated movement identifier of the target client to the first client and the second client, a movement-request data-packet sent by the second client, the movement-request data-packet sent by the second client carrying a current movement identifier of the second client indicating that the second client controls a third character movement on the second client;

determining, according to the current movement identifier of the second client, whether the third character movement on the second client meets the deviation tolerance condition configured in the server; and filtering out the movement-request data-packet sent by the second client, and sending a movement refusal instruction to the second client if the third character movement on the second client does not meet the deviation tolerance condition.

10. The server according to claim 8, wherein the processor is further configured to perform:

receiving, after broadcasting the updated movement identifier of the target client to the first client and the second client, a movement-request data-packet sent by the second client, the movement-request data-packet sent by the second client carrying a current movement identifier of the second client indicating that the second client controls a third character movement on the second client;

determining, according to the current movement identifier of the second client, whether the third character movement on the second client meets the deviation tolerance condition configured in the server; and filtering out the movement-request data-packet sent by the second client, and sending a movement refusal instruction to the second client if the third character movement on the second client does not meet the deviation tolerance condition.

11. A non-transitory computer readable storage medium storing computer instructions, the computer instructions, when being executed by a processor of a server, causing the processor to perform:

receiving a movement-request data-packet sent by a first client, the server being configured to manage a character movement on the first client and a character movement on a second client in a same game scene;

determining a target client according to the movement-request data-packet, a character on the target client being a character whose movement needs to be controlled by the first client, comprising:

when the movement-request data-packet of the first client carries a current movement identifier of the first client indicating that the first client controls a first character movement on the first client, determining, by the server, that the target client is the first client; and when the movement-request data-packet of the first client carries a request for controlling a second character movement on the second client by the first client, determining, by the server, that the target client is the second client; and updating a movement identifier of the target client, and broadcasting the updated movement identifier of the target client to the first client and the second client, comprising:

determining, by the server according to the current movement identifier of the first client, whether the first character movement on the first client meets a deviation tolerance condition configured in the server; and when the first character movement on the first client does not meet the deviation tolerance condition, updating, by the server, the current movement identifier of the first client, and sending a movement refusal instruction to the first client, the movement refusal instruction carrying the updated movement identifier of the first client.

12. The storage medium according to claim 11, wherein the updating a movement identifier of the target client comprises:
  obtaining a recorded movement identifier of the second client from a local synchronization list of the server when the target client is the second client; and
  updating the recorded movement identifier of the second client according to the deviation tolerance condition configured in the server, and saving the updated movement identifier of the second client.

* * * * *